(12) United States Patent
Yu et al.

(10) Patent No.: US 11,931,614 B2
(45) Date of Patent: Mar. 19, 2024

(54) FIRE-EXTINGUISHING AGENT CAPABLE OF EXTINGUISHING COMBUSTION OF ALUMINUM SLAG, AND PREPARATION METHOD THEREFOR AND USE THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

(72) Inventors: Haijun Yu, Guangdong (CN); Yingsheng Zhong, Guangdong (CN); Yinghao Xie, Guangdong (CN); Changdong Li, Guangdong (CN); Xuemei Zhang, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/265,374

(22) PCT Filed: Dec. 30, 2021

(86) PCT No.: PCT/CN2021/142930
§ 371 (c)(1),
(2) Date: Jun. 5, 2023

(87) PCT Pub. No.: WO2022/252601
PCT Pub. Date: Dec. 8, 2022

(65) Prior Publication Data
US 2024/0033554 A1    Feb. 1, 2024

(30) Foreign Application Priority Data

May 31, 2021    (CN) .......................... 202110601149.5

(51) Int. Cl.
*A62D 1/00*    (2006.01)
(52) U.S. Cl.
CPC ......... *A62D 1/0014* (2013.01); *A62D 1/0007* (2013.01)
(58) Field of Classification Search
None
See application file for complete search history.

(56) References Cited

U.S. PATENT DOCUMENTS

| 5,053,147 A | 10/1991 | Kaylor |
| 5,062,996 A | 11/1991 | Kaylor |

(Continued)

FOREIGN PATENT DOCUMENTS

| CN | 102512779 A | 6/2012 |
| CN | 103638628 A | 3/2014 |

(Continued)

OTHER PUBLICATIONS

International Search Report and Written Opinion of the International Search Authority issued by the China National Intellectual Property Administration for International Patent Application No. PCT/CN2021/142930, dated Apr. 7, 2022, with an English translation.

(Continued)

*Primary Examiner* — Joseph D Anthony
(74) *Attorney, Agent, or Firm* — MYERS WOLIN, LLC

(57) ABSTRACT

A fire-extinguishing agent capable of extinguishing the combustion of aluminum slag, and a preparation method therefor and the use thereof. The fire-extinguishing agent comprises the following raw materials: a sulfate, a chlorine salt, a mineral, a silica gel, a surfactant and a stearate. The (Continued)

main materials of sulfate and chlorine salt are solid waste containing sulfate and chlorine salt obtained by separating high-salt wastewater generated during a resynthesis process of a positive electrode material of a waste lithium battery. The solid waste containing sulfate and chlorine salt is used as a material for a fire-extinguishing agent, which can effectively recycle waste resources. The wastewater of a large amount and high salt content produced in the synthesis process of the positive electrode material of the waste lithium battery is separated and evaporated to obtain more solid wastes containing sulfate and chlorine salt, which can be used as the main material for preparing fire-extinguishing agents on a large scale.

4 Claims, 2 Drawing Sheets

(56) References Cited

U.S. PATENT DOCUMENTS

| | | | |
|---|---|---|---|
| 8,471,031 B2* | 6/2013 | Schoning | C07B 43/00 546/184 |
| 2012/0048577 A1* | 3/2012 | Ball | A62C 3/006 169/65 |
| 2014/0202717 A1 | 7/2014 | Klaffmo et al. | |
| 2015/0158271 A1* | 6/2015 | Hoshino | C08J 5/043 442/104 |
| 2015/0224352 A1 | 8/2015 | Klaffmo et al. | |

FOREIGN PATENT DOCUMENTS

| | | |
|---|---|---|
| CN | 103751942 A | 4/2014 |
| CN | 104511127 A | 4/2015 |
| CN | 107626067 A | 1/2018 |
| CN | 112206457 A | 1/2021 |
| CN | 113413569 A | 9/2021 |
| CN | 113413569 B | 8/2022 |

OTHER PUBLICATIONS

First Office Action and Search Report issued by the State Intellectual Property Office of People's Republic of China for Chinese Patent Application No. 202110601149.5, dated Jan. 10, 2022, with an English translation.

Notification to Grant Patent Right for Invention issued by the State Intellectual Property Office of People's Republic of China for Chinese Patent Application No. 202110601149.5, dated Jun. 8, 2022, with an English translation.

* cited by examiner

FIRE-EXTINGUISHING AGENT CAPABLE OF EXTINGUISHING COMBUSTION OF ALUMINUM SLAG, AND PREPARATION METHOD THEREFOR AND USE THEREOF

CROSS-REFERENCE TO RELATED APPLICATIONS

This application is a National Stage under 35 U.S.C. § 371 of International Application Number PCT/CN2021/142930, filed on Dec. 30, 2021, and which designated the U.S., which claims priority to Chinese patent application No. 202110601149.5 filed on May 31, 2021. The contents of each are incorporated herein by reference in their entirety.

TECHNICAL FIELD

The present disclosure belongs to the technical field of fire extinguishing agents and particularly relates to a fire extinguishing agent capable of extinguishing aluminum slag combustion and a preparation method and application thereof.

BACKGROUND

A lithium battery material is widely applied to industries such as lithium battery manufacturing, 3C digital and new energy vehicles, industrial energy storage and the like. Meanwhile, more waste lithium batteries are produced. A recycling process of the waste lithium batteries includes the following steps: discharging, dismantling, separating, high-temperature and wet metallurgy, re-synthesis of cathode materials, etc. During the separation of the waste lithium battery material, aluminum slag and waste aluminum foil are generated and acid, alkali and water remain. When meeting the acid, alkali and water, the stacked aluminum slag reacts violently. Since the aluminum slag is stacked in an open place, a large amount of hydrogen is generated in a short time, thus combustion and explosion may happen. The aluminum slag has a high combustion temperature, a high combustion spreading speed and a high explosion power, can produce quite high radiant heat, and can also react with air, water and carbon dioxide. Therefore, the aluminum slag in combustion is difficult to remove and isolate, and a fire disaster is very difficult to extinguish.

SUMMARY

The present disclosure aims to solve at least one of the technical problems in the prior art. For this reason, the present disclosure provides a fire extinguishing agent capable of extinguishing aluminum slag combustion and a preparation method and application thereof. The sulfate and chloride salt are main materials of the fire extinguishing agent and solid waste containing sulfate and chloride salt obtained by separating high-salinity waste water generated in a re-synthesis process of a cathode material of a waste lithium battery. The solid waste containing sulfate and chloride salt is used as the material of the fire extinguishing agent, such that waste resources can be effectively recycled.

In order to achieve the above objective, the present disclosure adopts the following technical solution:

A fire extinguishing agent capable of extinguishing aluminum slag combustion, including the following raw materials: sulfate, chloride salt, a mineral, silica gel, a surfactant and stearate.

Preferably, the sulfate, chloride salt, mineral and silica gel may be prepared to obtain a powder.

Furthermore, a mass ratio of the powder, surfactant and stearate may preferably be 100:(1-5):(0.05-0.25).

Preferably, the sulfate may be sodium sulfate and calcium sulfate.

Preferably, the chloride salt may be sodium chloride and calcium chloride.

Furthermore, a mass ratio of the sodium sulfate, sodium chloride, calcium sulfate and calcium chloride may be (50-80):(20-40):(2-10):(1-10).

Preferably, the mineral may be at least one of quartz sand, quartzite, sandstone, silica and opal.

Preferably, the surfactant may be polydimethylsiloxane.

Preferably, the stearate may be one of sodium stearate, magnesium stearate, calcium stearate and zinc stearate.

A preparation method of a fire extinguishing agent capable of extinguishing aluminum slag combustion, including the following steps:

(1) calcinating solid waste containing sulfate and chloride salt, dissolving by adding water, performing filtration to obtain a filtrate, and performing evaporation and crystallization to obtain crystals;

(2) adding the crystals to liquid nitrogen for soaking and mixing the soaked crystals with mineral and silica gel to prepare a powder; and (3) mixing the powder, surfactant and stearate and drying an obtained mixture to obtain the fire extinguishing agent capable of extinguishing aluminum slag combustion.

Preferably, in step (1), the solid waste containing sulfate and chloride salt may be obtained by membrane separation and evaporation of salt-containing waste water produced in a re-synthesis process of a cathode material of a waste lithium battery.

Furthermore, main ingredients of the solid waste containing sulfate and chloride salt may preferably be sodium sulfate and sodium chloride.

Preferably, in step (1), the calcinating is performed at a calcination temperature of 400-800° C. for 0.5-3 h and at a temperature rising rate of 10-30° C./min.

Preferably, in step (1), a temperature of the water may be 30-95° C.; and a mass ratio of the solid waste containing sulfate and chloride salt to the water may be (20-40):100.

Preferably, in step (1), the evaporation may be performed at a vacuum degree of 0.02-0.06 MPa and an evaporation amount of 400 kg/h.

Preferably, in step (1), the screening may use a screening net at a pore diameter of 200-400 mesh.

Preferably, in step (2), a mass ratio of the crystals to the liquid nitrogen may be 10:(1-3).

Preferably, in step (2), a mass ratio of the crystals, mineral and silica gel may be 100:(1-5):(1-2).

Preferably, in step (2), the mineral may be at least one of quartz sand, quartzite, sandstone, silica and opal.

Preferably, in step (2), the silica gel may be in a micro-powder form.

Preferably, in step (2), the silica gel may be analytically pure or has a purity ≥98%.

Preferably, in step (2), the mixing may be performed for 1-5 min and at a rotating speed of 120-360 r/min.

Preferably, in step (2), the grinding may be performed for 15-60 min; and a grinder used for the grinding may have a rotating speed of 200-720 r/min.

Preferably, in step (2), the ground powder may have a particle size of <100 μm.

Preferably, in step (3), a mass ratio of the powder, surfactant and stearate may be 100:(1-5):(0.05-0.25).

Preferably, in step (3), the surfactant may be polydimethylsiloxane.

Furthermore, the polydimethylsiloxane and stearate may preferably be analytically pure or purer.

Preferably, in step (3), the stearate may be one of sodium stearate, magnesium stearate, calcium stearate and zinc stearate.

Preferably, in step (3), the mixing may be performed at 40-90° C. for 30-60 min and at a rotating speed of 120-360 r/min.

Preferably, in step (3), the drying may be performed to the water content of <2.5%.

A principle of extinguishing aluminum slag combustion by a fire extinguishing agent is as follows: firstly, coating: the fire extinguishing agent has main components of sulfate and chloride salt which do not have chemical reaction with burning metals (aluminum, iron, copper and alloy thereof) to generate physical coating by high-temperature melting, and meanwhile an auxiliary material (a mineral: quartz) in the fire extinguishing agent has limited chemical reaction with burning aluminum slag to form a non-combustible inert compound to passivate a surface of the aluminum slag to generate chemical coating; secondly, heat absorption: vibration of sodium sulfate and sodium chloride molecules is intensified at high temperature and in order to reduce constraint among the molecules, heat generated by metal combustion can be continuously absorbed in a melting process. Therefore, aluminum slag combustion is extinguished by isolation and suffocation through the physical and chemical coating along with heat absorption.

Compared with the prior art, the present disclosure has the following beneficial effects:

1. The sulfate and chloride salt are main materials of the fire extinguishing agent in the present disclosure and main component salts of waste water generated in a re-synthesis process of a cathode material of a waste lithium battery. The waste water is used as the material of the fire extinguishing agent, such that waste resources can be effectively recycled. The selected quartz minerals as auxiliary materials come from the natural world, such that production cost of the fire extinguishing agent can be reduced. Waste water generated in a re-synthesis process of the cathode material of the waste lithium battery has a large amount and high salt content, and more solid waste containing sulfate and chloride salt is obtained through separation and evaporation, such that the solid waste can be used as the main material for preparing a large amount of the fire extinguishing agent.

2. The fire extinguishing agent of the present disclosure has effects of physical fire extinguishing and chemical fire extinguishing: the main fire extinguishing components of the fire extinguishing agent, namely sodium sulfate and sodium chloride, do not react with burnt aluminum slag and only have a physical-covering effect by melting; other impurity salts in the solid waste containing sulfate and chloride, such as chloride salts of magnesium chloride, calcium chloride and the like, can also be used as effective components of the fire extinguishing agent; and other auxiliary materials of the fire extinguishing agent limited chemical reaction with burning aluminum slag to form a non-combustible inert compound to passivate a surface of aluminum for chemical covering.

3. After treated by liquid nitrogen, the crystals have an unstable crystal structure are easy to damage, such that after grinding, a powder has a smaller particle size and increased surface area and surface energy, and is easy for physical covering and chemical covering of the burning aluminum slag, thereby improving fire extinguishing efficiency of the fire extinguishing agent. Since the powder after the crystals are ground is easy to absorb moisture to cause agglomeration, the added polydimethylsiloxane has a hydrophobic property and a performance of enhancing moisture resistance to the fire extinguishing agent.

4. The surfactant, polydimethylsiloxane, has a good chemical stability and characteristics of strong surface activity, inertness, no toxicity and non-inflammability. Meanwhile, the function of the surfactant can be stably and effectively exerted in systems of residual acid, residual alkali and the like in the aluminum slag, and cannot react with a combustion reaction system of the aluminum slag or decompose. The high chemical stability of the polydimethylsiloxane means high chemical inertness. The surfactant, polydimethylsiloxane, can be well compatible with powder, quartz minerals and stearate to keep stability among the materials and has a hydrophobic capacity to reduce a moisture absorption capacity of the fire extinguishing agent.

5. The stearate in the present disclose has main functions of reducing resistance to agglomeration between particles and strengthening an effect of the polydimethylsiloxane on coating the powder. The silica gel in the present disclosure has an effect of assisting grinding. The grinding can reduce the friction between the particles to improve the fluidity of the particles and reduce a weight difference between the particles of different materials. The mineral in the present disclosure has an excellent electrical insulation property and can ensure an electrical insulation of the fire extinguishing agent after being added into the fire extinguishing agent.

6. The fire extinguishing agent of the present disclosure can replace a conventional type D fire extinguishing agent product for extinguishing metal combustion. The fire extinguishing agent can be loaded into portable, trolley, hanging and other fire extinguisher bottles, and can be used to extinguish the metal fire of iron, copper and other simple substances or alloy thereof.

DETAILED DESCRIPTION

Figure 1:
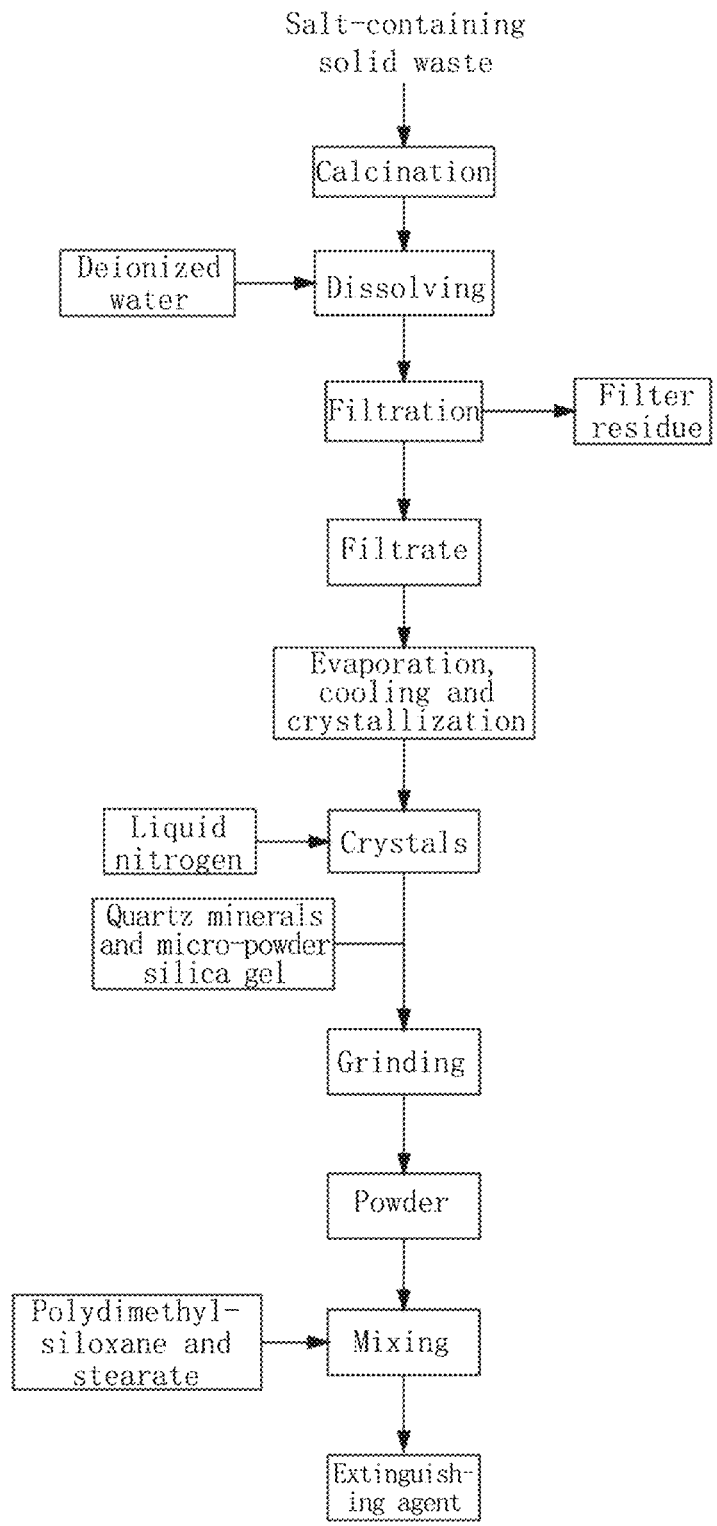
FIG. 1 is a flow chart of preparation of the fire extinguishing agent capable of extinguishing aluminum slag combustion in Embodiment 1 of the present disclosure.

Hereinafter, the concept and resulting technical effects of the present disclosure will be described clearly and completely with reference to the embodiments, so as to fully understand the purpose, features and effects of the present disclosure. Obviously, the described embodiments are only a part of the embodiments of the present disclosure, not all the embodiments. All other embodiments obtained by those skilled in the art based on the embodiments of the present disclosure and without any creative efforts are within the scope of the present disclosure.

Embodiment 1

A preparation method of a fire extinguishing agent capable of extinguishing aluminum slag combustion of the present embodiment included the following steps:

(1) collection: high-salinity waste water generated in a re-synthesis process of a cathode material of a waste lithium battery was subjected to membrane separation and evaporation to obtain 56 kg of solid waste containing sulfate and chloride salt (salt-containing solid waste);

(2) purification: in a ventilated environment, the solid waste containing sulfate and chloride was calcinated at a heating rate of 10° C./min to 400° C. for 3 h, the calcinated solid waste was added into 65° C. deionized water to dissolve at a mass ratio of 35:100, a filtrate and a filter residue were separated by filtration with a 200-mesh sieve, the filtrate was evaporated under a vacuum of 0.04 MPa for 12 min, and cooling, crystallization and drying in an outdoor environment for 5 d were performed to obtain crystals (sodium sulfate accounted for 57.10%, sodium chloride accounted for 22.56%, water accounted for 15.43%, calcium sulfate accounted for 3.25% and calcium chloride accounted for 1.66%);

(3) grinding: the crystals were soaked in liquid nitrogen at a mass ratio of the crystals to the liquid nitrogen at 10:1, the soaking was performed until the liquid nitrogen evaporated, the crystals were heated to a room temperature, the crystals, minerals (quartz sand, quartzite and sandstone) and micro-powder silica gel at a mass ratio of 100:2:1 were added into a clean mixer at a rotating speed of 150 r/min for mixing for 2 min, a mixed material was added to a clean ball grinder at a rotating speed of 480 r/min for grinding for 45 min at a discharging time of 3 min (the discharging amount was 0.5 t/h and the grinding mass was 27.6 kg), and a powder with a particle size <100 μm was obtained after the grinding; and (4) modification: the powder, polydimethylsiloxane and sodium stearate at a mass ratio of 100:1:0.05 were added into a clean and dry mixer with a rotating speed of 150 r/min, mixing was performed at a temperature of 70° C. for 35 min, drying was performed to obtain a fire extinguishing agent product, the dried fire extinguishing agent product had the water content of 1.87% by measuring and the extinguishing agent capable of extinguishing aluminum slag combustion was obtained.

A method for extinguishing fire during aluminum slag combustion included the following specific steps:

(1) a stored fire extinguishing agent was injected into a dry storage tank and meanwhile, dry argon was filled into the storage tank for storage, where a volume ratio of the extinguishing agent to the inert gas was 8:1 and a pressure of the storage tank was 2.5 MPa; and (2) the fire extinguishing agent in the storage tank was injected into a 10-kg suspension type fire extinguisher, a 5-kg aluminum slag pile was stored in an aluminum slag storage tank, the fire extinguisher was about 0.8 m away from a top of the aluminum slag pile, the aluminum slag storage tank was 14 m² (4 m*3.5 m), the aluminum slag was ignited, and when the fire extinguisher sensed a temperature of the aluminum slag combustion, the extinguishing agent was sprayed to extinguish fire.

Figure 2:
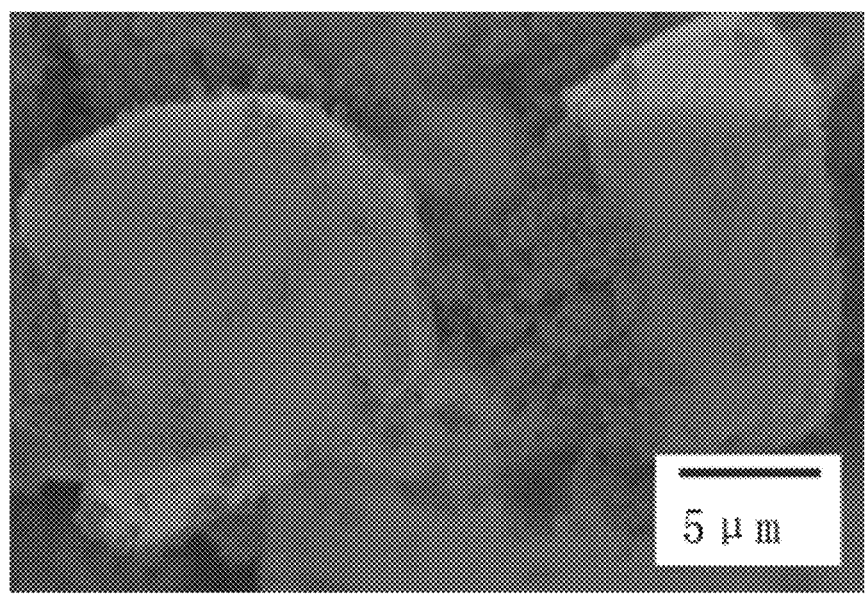
FIG. 2 is a scanning electron microscope (SEM) image of the fire extinguishing agent capable of extinguishing aluminum slag combustion in Embodiment 1 of the present disclosure.

FIG. 1 was a flow chart of preparation of the fire extinguishing agent capable of extinguishing aluminum slag combustion in Embodiment 1 of the present disclosure; it can be seen from FIG. 1 that solid waste containing sulfate and chloride was calcinated, dissolved in water, treated with liquid nitrogen and ground, and a mineral, micro-powder silica gel, polydimethylsiloxane and stearate were added to prepare an extinguishing agent capable of extinguishing aluminum slag combustion. FIG. 2 is a scanning electron microscope (SEM) image of the fire extinguishing agent capable of extinguishing aluminum slag combustion in Embodiment 1 of the present disclosure; from the SEM image, it can be seen that large particles were a powder and the powder was attached to other small particles.

Embodiment 2

A preparation method of a fire extinguishing agent capable of extinguishing aluminum slag combustion of the present embodiment included the following steps:

(1) collection: high-salinity waste water generated in a re-synthesis process of a cathode material of a waste lithium battery was subjected to membrane separation and evaporation to obtain 91 kg of solid waste containing sulfate and chloride salt;

(2) purification: in a ventilated environment, the solid waste containing sulfate and chloride was calcinated at a heating rate of 18° C./min to 550° C. for 2 h, the calcinated solid waste was added into 65° C. deionized water to dissolve at a mass ratio of 35:100, a filtrate and a filter residue were separated by filtration with a 200-mesh sieve, the filtrate was evaporated under a vacuum of 0.04 MPa for 12 min, and cooling, crystallization and drying in an outdoor environment for 5 d were performed to obtain crystals (sodium sulfate accounted for 53.58%, sodium chloride accounted for 27.24%, water accounted for 11.69%, calcium sulfate accounted for 5.98% and calcium chloride accounted for 1.51%), (3) grinding: the crystals were soaked in liquid nitrogen at a mass ratio of the crystals to the liquid nitrogen at 10:2.5, the soaking was performed until the liquid nitrogen evaporated, the crystals were heated to a room temperature, the crystals, minerals (quartz sand, quartzite and sandstone) and micro-powder silica gel at a mass ratio of 100:2.5:2 were added into a clean mixer at a rotating speed of 150 r/min for mixing for 2 min, a mixed material was added to a clean ball grinder at a rotating speed of 480 r/min for grinding for 45 min at a discharging time of 4 min (the discharging amount was 0.5 t/h and the grinding mass was 35.7 kg), and a powder with a particle size <100 μm was obtained after the grinding; and (4) modification: the powder, polydimethylsiloxane and sodium stearate at a mass ratio of 100:2:0.17 were added into a clean and dry mixer with a rotating speed of 150 r/min, mixing was performed at a temperature of 70° C. for 35 min, drying was performed to obtain a fire extinguishing agent product, the dried fire extinguishing agent product had the water content of 1.41% by measuring and the extinguishing agent capable of extinguishing aluminum slag combustion was obtained.

A method for extinguishing fire during aluminum slag combustion included the following specific steps:
(1) a stored fire extinguishing agent was injected into a dry storage tank and meanwhile, dry argon was filled into the storage tank for storage, where a volume ratio of the extinguishing agent to the inert gas was 9:1 and a pressure of the storage tank was 2.5 MPa; and
(2) the fire extinguishing agent in the storage tank was injected into a 10-kg suspension type fire extinguisher, a 5-kg aluminum slag pile was stored in an aluminum slag storage tank, the fire extinguisher was about 0.7 m away from a top of the aluminum slag pile, the aluminum slag storage tank was 14 m² (4 m*3.5 m), the aluminum slag was ignited, and when the fire extinguisher sensed a temperature of the aluminum slag combustion, the extinguishing agent was sprayed to extinguish fire.

Embodiment 3

A preparation method of a fire extinguishing agent capable of extinguishing aluminum slag combustion of the present embodiment included the following steps:
(1) collection: high-salinity waste water generated in a re-synthesis process of a cathode material of a waste lithium battery was subjected to membrane separation and evaporation to obtain 56 kg of solid waste containing sulfate and chloride salt;
(2) purification: in a ventilated environment, the solid waste containing sulfate and chloride was calcinated at a heating rate of 30° C./min to 750° C. for 0.5 h, the calcinated solid waste was added into 65° C. deionized water to dissolve at a mass ratio of 35:100, a filtrate and a filter residue were separated by filtration with a 400-mesh sieve, the filtrate was evaporated under a vacuum of 0.04 MPa for 12 min, and cooling, crystallization and drying in an outdoor environment for 5 d were performed to obtain crystals (sodium sulfate accounted for 52.46%, sodium chloride accounted for 23.08%, water accounted for 15.97%, calcium sulfate accounted for 4.75% and calcium chloride accounted for 3.74%);
(3) grinding: the crystals were soaked in liquid nitrogen at a mass ratio of the crystals to the liquid nitrogen at 10:3, the soaking was performed until the liquid nitrogen evaporated, the crystals were heated to a room temperature, the crystals, minerals (quartz sand, quartzite and sandstone) and micro-powder silica gel at a mass ratio of 100:3:2 were added into a clean mixer at a rotating speed of 150 r/min for mixing for 2 min, a mixed material was added to a clean ball grinder at a rotating speed of 480 r/min for grinding for 45 min at a discharging time of 6 min (the discharging amount was 0.5 t/h and the grinding mass was 47.3 kg), and a powder with a particle size <100 μm was obtained after the grinding; and
(4) modification: the powder, polydimethylsiloxane and sodium stearate at a mass ratio of 100:5:0.25 were added into a clean and dry mixer with a rotating speed of 150 r/min, mixing was performed at a temperature of 70° C. for 35 min, drying was performed to obtain a fire extinguishing agent product, the dried fire extinguishing agent product had the water content of 1.87% by measuring and the extinguishing agent capable of extinguishing aluminum slag combustion was obtained.

A method for extinguishing fire during aluminum slag combustion included the following specific steps:
(1) a stored fire extinguishing agent was injected into a dry storage tank and meanwhile, dry argon was filled into the storage tank for storage, where a volume ratio of the extinguishing agent to the inert gas was 7.5:1 and a pressure of the storage tank was 2.5 MPa; and
(2) the fire extinguishing agent in the storage tank was injected into a 10-kg suspension type fire extinguisher, a 4.3-kg aluminum slag pile was stored in an aluminum slag storage tank, the fire extinguisher was about 0.8 m away from a top of the aluminum slag pile, the aluminum slag storage tank was 14 m² (4 m*3.5 m), the aluminum slag was ignited, and when the fire extinguisher sensed a temperature of the aluminum slag combustion, the extinguishing agent was sprayed to extinguish fire.

Comparative Example 1

A method for extinguishing fire during aluminum slag combustion included the following specific steps:
A difference from Embodiment 1 was that soaking by liquid nitrogen was not performed in step (3).

Comparative Example 2

A method for extinguishing fire during aluminum slag combustion included the following specific steps:
A difference from Embodiment 1 was that quartz minerals and micro-powder silica gel are not added in step (3).

Comparative Example 3

A method for extinguishing fire during aluminum slag combustion included the following specific steps:
A difference from Embodiment 1 was that polydimethylsiloxane was not added in step (4).

Comparative Example 4

A method for extinguishing fire during aluminum slag combustion included the following specific steps:
A difference from Embodiment 1 was that sodium stearate was not added in step (4).

Analysis of comparative examples and embodiments:
In Table 1, the particle size of the powder was measured by a laser particle size analyzer, the water content was measured by a conventional method, and the time required for extinguishing aluminum slag combustion was from 30 seconds after the aluminum slag started to burn to the time required for extinguishing fire after the fire extinguishing agent was sprayed to the burning aluminum slag.

In Table 1, it can be seen that compared with Comparative examples 1 and 2, the particle size of the powder in Embodiments 1, 2, and 3 were all <100 the powder had a smaller particle size and increased surface area and surface energy, and was easy for physical covering and chemical covering of the burning aluminum slag, thus the fire extinguishing efficiency of the fire extinguishing agent was high. Compared with comparative example 3, the water content in Embodiments 1, 2, and 3 were all <2.5%. The fire extinguishing time in Embodiments 1, 2, and 3 was shorter than that of comparative examples 1, 2, and 3, indicating a better fire extinguishing effect.

TABLE 1

Parameters in embodiments and comparative examples

| Treatment Group | Proportion of particle size of powder in each range (%) | | | | Water Content of Extinguishing Agent (%) | Time Required for Extinguishing Aluminum Slag Combustion (s) |
|---|---|---|---|---|---|---|
| | 0-20 μm | 20-50 μm | 50-100 μm | >100 μm | | |
| Embodiment 1 | 25.53 | 41.07 | 33.4 | / | 1.87 | 34 |
| Embodiment 2 | 43.18 | 25.56 | 31.26 | / | 1.41 | 31 |
| Embodiment 3 | 48.65 | 26.14 | 25.21 | / | 1.19 | 27 |
| Comparative example 1 | 15.36 | 26.18 | 38.16 | 20.3 | 1.66 | 41 |
| Comparative example 2 | 12.41 | 22.56 | 48.71 | 16.32 | 2.41 | 34 |
| Comparative example 3 | 23.67 | 39.35 | 36.98 | / | 12.56 | 56 |
| Comparative example 4 | 38.51 | 35.58 | 21.43 | 4.48 | 3.38 | 41 |

It can be seen from Embodiment 1 and Comparative example 1 that in Comparative example 1 the crystals were not treated with liquid nitrogen, a crystal structure of the crystals was not easily destroyed, such that the particle size of the powder cannot be reduced after the grinding, it was not easy for physical covering and chemical covering of the burning aluminum slag, thus the fire extinguishing efficiency of the fire extinguishing agent was reduced.

It can be seen from Embodiment 1 and Comparative example 2 that in Comparative example 2 quartz minerals and micro-powder silica gel were not added, the particle size of the powder was large during the grinding, and the proportion of the particle size of the powder was higher in a range of 50-100 μm and >100 μm; and the proportion of the particle size of the powder in a range of 20-50 μm was the highest in Embodiment 1.

It can be seen from Embodiment 1 and Comparative example 3 that in Comparative example 3, polydimethylsiloxane was not added, a hydrophobic capacity was poor, the water content was increased, thus the time for extinguishing aluminum slag combustion became longer.

It can be seen from Embodiment 1 and Comparative example 4 that in Comparative example 4 stearate was not added, particles agglomerated, the powder had the larger particle size, the time for the polydimethylsiloxane to coat the powder became longer, thus the time for extinguishing aluminum slag combustion became longer.

Although the embodiments of the present disclosure are described in detail above with reference to the accompanying drawings, the present disclosure shall not be limited to the embodiments. Any person skilled in the art can make changes without departing from the scope of the present disclosure. In addition, in the case of no conflict, the embodiments of the present disclosure and the features in the embodiments can be combined with each other.

The invention claimed is:

1. A fire extinguishing agent capable of extinguishing aluminum slag combustion, comprising the following raw materials: sulfate, chloride salt, a mineral, silica gel, a surfactant and stearate, wherein the fire extinguishing agent capable of extinguishing aluminum slag combustion is prepared by a preparation method comprising the following steps:
   (1) calcinating solid waste containing sulfate and chloride salt, dissolving by adding water, performing filtration to obtain a filtrate, and performing evaporation and crystallization to obtain crystals;
   (2) adding the crystals to liquid nitrogen for soaking and mixing the soaked crystals with the mineral and silica gel to prepare a powder, and
   (3) mixing the powder, surfactant and stearate and drying an obtained mixture to obtain the fire extinguishing agent capable of extinguishing aluminum slag combustion;
   wherein, the sulfate is sodium sulfate and calcium sulfate; the chloride salt is sodium chloride and calcium chloride; the surfactant is polydimethylsiloxane; the stearate is one of sodium stearate, magnesium stearate, calcium stearate and zinc stearate; the mineral is at least one of quartz sand, quartzite, silica and opal; the mass ratio of the powder, surfactant and stearate is 100:(1-5):(0.05-0.25); the mass ratio of the sodium sulfate, sodium chloride, calcium sulfate and calcium chloride is (50-80):(20-40):(2-10):(1-10); and wherein in step (2), the mass ratio of the crystals to the liquid nitrogen is 10:(1-3); and in step (2), the mass ratio of the crystals, the mineral and the silica gel is 100:(1-5):(1-2).

2. The fire extinguishing agent capable of extinguishing aluminum slag combustion according to claim 1, wherein in step (1), the solid waste containing sulfate and chloride salt is obtained by membrane separation and evaporation of salt-containing waste water produced in a re-synthesis process of a cathode material of a waste lithium battery.

3. The fire extinguishing agent capable of extinguishing aluminum slag combustion according to claim 1, wherein in step (1), the calcinating is performed at a calcination temperature of 400-800° C. for 0.5-3 h and at a temperature rising rate of 10-30° C./min.

4. A fire extinguisher, comprising the fire extinguishing agent capable of extinguishing aluminum slag combustion according to claim 1.

* * * * *